3,247,208
PIPERIDYL-NAPHTHALENE-1:8-DICARBOXYLIC ACID IMIDES

Karl Schenker, Basel, Switzerland, assignor to Ciba Corporation, New York, N.Y., a corporation of Delaware
No Drawing. Filed Mar. 20, 1963, Ser. No. 266,523
Claims priority, application Switzerland, Apr. 10, 1962, 4,368/62; Feb. 14, 1963, 1,900/63
12 Claims. (Cl. 260—281)

The present invention relates to new piperidine compounds. More especially it concerns N-[1'-R-piperidyl]-naphthalene-1:8-dicarboxylic acid imides, in which R represents an alkyl residue or an aralkyl residue, and the salts thereof.

In the new compounds the piperidyl residue is advantageously a piperidyl-(4)-residue. The piperidyl residue may also be substituted, especially by lower alkyl residues.

The aromatic residues may also be substituted, for example, by lower alkyl residues, such as methyl, ethyl, n-propyl or isopropyl residues, linear or branched butyl, pentyl or hexyl residues bound in any desired position, lower alkoxy groups, for example, groups containing 1 to 6 carbon atoms, such as methoxy, ethoxy, propoxy or butoxy groups, halogen atoms, such as chlorine, bromine or iodine, nitro groups, amino groups and/or trifluoromethyl groups.

In the new compounds R represents an alkyl residue or an aralkyl residue. The aralkyl residue can be substituted, as described above. The aralkyl residues are advantageously residues containing at most two nuclei, such as naphthyl-lower-alkyl residues or especially phenyl-lower-alkyl residues, for example phenyl-ethyl, -propyl or -butyl residues, but more especially benzyl residues.

The alkyl residue may be, for example, one of the aforesaid lower alkyl residues or a higher alkyl residue, such as a heptyl, an octyl, a nonyl, a decyl, an undecyl or a dodecyl residue. Advantageously it contains not more than 12 carbon atoms, preferably 4 to 12 carbon atoms.

The new compounds possess valuable pharmacological properties. In particular they exhibit good local anesthetic properties, and can thus be used for pharmacological purposes or as medicaments, also in veterinary medicine. Furthermore, they are also useful as intermediate products, especially in the manufacture of pharmacologically active compounds.

Of special interest is the N-[1'-benzyl-piperidyl-(4')]-naphthalene-1:8-dicarboxylic acid imide of the formula

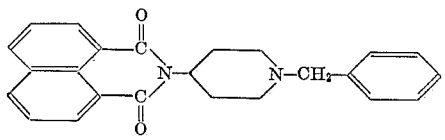

and the salts thereof.

The new compounds are obtained by methods in themselves known. Advantageously, the procedure is to react a halide or anhydride of an appropriate naphthalene-1:8-dicarboxylic acid with a (1-R-piperidyl)-amine, in which R has the meaning given above.

The reaction is carried out in the usual manner in the absence of solvents, for example, in the melt or advantageously in the presence of solvents and/or diluents, such as polar organic solvents, such as dioxane, tetrahydrofuran or preferably dimethyl-formamide at low or normal temperature or advantageously at a raised temperature in an open vessel or in a closed vessel under pressure.

Another method of preparing the new compounds consists in reducing the pyridine ring contained in N-pyridyl-naphthalene-1:8-dicarboxylic acid imides, that are quaternized at the nitrogen atom of the pyridine nucleus by an alkyl or aralkyl residue, to the piperidine ring.

The reduction of the quaternized pyridine ring is carried out in a manner in itself known, and under conditions in which the di-carboxylic acid imide grouping is not attacked. Advantageously, the pyridine ring is first reduced with nascent hydrogen, for example, with an alkali metal boron hydride, such as sodium boron hydride, to the tetrahydropyridine ring. The ring so formed can then be reduced to the piperidine ring, for example, with catalyst-stimulated hydrogen, for example, hydrogen in the presence of a hydrogenation catalyst, such as palladium, for example, palladium-carbon, platinum or nickel, such as Raney nickel.

The said reductions are carried out in a manner in itself known, advantageously in the presence of solvents and/or diluents at normal temperature or low temperature or at a raised temperature in an open vessel or in a closed vessel under pressure.

The new compounds can also be prepared by alkylating or aralkylating an N-[piperidyl]-naphthalene-1:8-dicarboxylic acid imide, that is unsubstituted at the nitrogen atom of its piperidine ring.

The alkylation or aralkylation is carried out in known manner, for example, by reaction with a reactive ester of an alkanol or aralkanol. Reactive esters are, for example, esters with strong inorganic acids, such as hydrohalic acids, for example, hydrochloric acid, hydrobromic acid or hydriodic acid, or sulfuric acid, or esters with strong organic acids, such as sulfonic acids, for example, arylsulfonic acids, such as benzene or toluene sulfonic acids. The reaction is carried out in a manner in itself known, advantageously in the presence of solvents or diluents and in the presence or absence of condensing agents, such as bases, at low, normal or raised temperatures in an open vessel or in a closed vessel under pressure.

Depending on the reaction conditions and the starting materials used, the new compounds are obtained in the free form or in the form of their salts. The salts thereof can be converted into the free compounds in a manner in itself known, for example, by reaction with a basic agent. Free bases which may be obtained can be converted into the salts with inorganic or organic acids. It is especially acids that are therapeutically acceptable that are used in the preparation of acid addition salts, such acids being, for example, hydrohalic acids, for example, hydrochloric acid or hydrobromic acid, perchloric acid, nitric acid or thiocyanic acid, sulfuric or phosphoric acids, or organic acids, such as formic acid, acetic acid, propionic acid, glycollic acid, lactic acid, pyroracemic acid, oxalic acid, malonic acid, succinic acid, maleic acid, fumaric acid, maleic acid, tartaric acid, citric acid, ascorbic acid, hydroxy-maleic acid, dihydroxy-maleic acid, benzoic acid, phenyl-acetic acid, 4-aminobenzoic acid, 4-hydroxy-benzoic acid, anthranilic acid, cinnamic acid, mandelic acid, salicylic acid, 4-aminosalicylic acid, 2-phenoxy-benzoic acid, 2-acetoxybenzoic acid, methane sulfonic acid, ethane sulfonic acid, hydroxyethane sulfonic acid, benzene sulfonic acid, halogenbenzene sulfonic acids, paratoluene sulfonic acid, naphthalene sulfonic acid or sulfamyl acids or methionine, tryptophan, lysine, or arginine.

The salts of the new compounds can also be used for purifying the free bases obtained, in that the free bases are converted into the salts, and the salts are isolated and the bases are again liberated from the salts.

The starting materials are known or, if they are new, they can be prepared by methods in themselves known. Some can be prepared by the method described above in which the procedure is suitably modified, and some by the choice of different starting materials.

The N-[piperidyl]-naphthalene - 1:8 - dicarboxylic acid imides which are unsubstituted at the nitrogen atom of the piperidine ring and which are used as starting materials likewise possess pharmacological properties. For example, they exhibit a histaminolytic action. Hence, they are likewise subjects of the present invention. They can be prepared, for example, by hydrogenolytically splitting off the benzyl group attached to the nitrogen atom of the piperidine ring in an N-[1'-benzyl-piperidyl]-naphthalene-1:8-naphthalene-dicarboxylic acid imide. The hydrogenolysis is carried out in the usual manner, advantageously in the presence of diluents or solvents, at room temperature or at a raised temperature.

The invention also includes the N-[1'-R-tetrahydropyridyl]-naphthalene-1:8-dicarboxylic acid imides obtained as intermediate products in the reduction of the N-pyridyl-naphthalene-1:8-dicarboxylic acid imides which are quaternized at the nitrogen atom of the pyridine nucleus by an alkyl or aralkyl radical. They also have a local anaesthetic effect and may therefore be used as medicaments.

The invention also includes any variant of the present process in which an intermediate obtainable at any stage thereof is used as starting material and the remaining steps are carried out, or the process is discontinued at any stage thereof or the starting material is formed under the reaction conditions. For example, an N[1'-R-piperidyl]-8-X-naphthalene-1-carboxylic acid amide, in which X represents a free or functionally modified carboxyl group and R has the meaning given above, is used as starting material, and the dicarboxylic acid imide ring is closed in the usual manner.

An N-[1'-R-tetrayhdropyridyl]-napthalene-1:8 - dicarboxylic acid imide can also be used as starting material, and the tetrahydropyridine ring therein can be reduced to a piperidine ring by the process described above.

The new compounds can be used as medicaments, for example, in the form of pharmaceutical preparations containing them or their salts in admixture or conjunction with an organic or inorganic, solid or liquid pharmaceutical excipient suitable for local administration. Suitable excipients are substances that do not react with the new compounds, for example, water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, ointments or creams, or in liquid form as solutions, suspensions or emulsions. They may be sterilized and/or may contain assistants such as preserving, stabilizing, wetting or emulsifying agents, salts for regulating the osmotic pressure, or buffers. They may also contain further therapeutically valuable substances. The preparations are formulated by conventional methods.

The following examples illustrate the invention without, however, limiting it.

*Example 1*

19.0 g. (0.1 mol) of 1-benzyl-4-aminopiperidine and 19.8 g. (0.1 mol) of naphthalene-1:8-dicarboxylic acid anhydride are boiled for 3 hours in 100 cc. of dimethylformamide under reflux. The reaction mixture is allowed to cool a little and is then diluted with water until the solution becomes turbid. The N-[1'-benzyl-piperidyl-(4')]-naphthalene-1:8-dicarboxylic acid imide of the formula

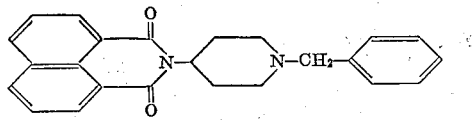

crystallizes out upon trituration and, when the reaction mixture is cool, it is isolated by suction filtration. The base melts at 148 to 150° C.

The hydrochloride, which is prepared in the usual manner, crystallizes from methanol-ether in the form of colorless flakes which melt at 254 to 256° C. It is rather sparingly soluble in cold water, but is readily soluble in hot water.

The N-[1'-benzyl-piperidyl-(4')]-naphthalene-1:8 - dicarboxylic acid imide can be debenzylated in the following manner:

10:2 g. (0.025 mol) of N-[1'-benzyl-piperidyl-(4')]-napthalene - 1:8 - dicarboxylic acid imide hydrochloride are dissolved in 100 cc. of ethanol and, after the addition of 1.0 g. of palladium carbon of 10% strength, catalytically debenzylated at 50° C. After 560 cc. (0.025 mol) of hydrogen have been taken up, the catalyst is filtered off and the solvent is evaporated. The residue crystallizes out immediately when 70 cc. of isopropanol are added. The N-(piperidyl-4')-naphthalene-1:8-dicarboxylic acid imide-hydrochloride so obtained and having the formula

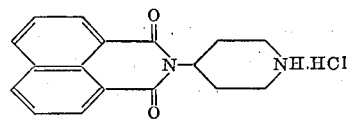

melts at 345° C. (with decomposition).

*Example 2*

31.7 g. (0.1 mol) of N-(piperidyl-4')-naphthalene-1:8-dicarboxylic acid imide-hydrochloride are dissolved in 200 cc. of water and, after the addition of 100 cc. of 2 N-sodium hydroxide solution, the free base is extracted with chloroform. When the chloroform has been evaporated, the base which remains is dissolved in 300 cc. of acetone; to the solution are added 1 g. of potassium iodide, 69 g. (0.5 mol) of finely ground anhydrous potassium carbonate and, finally, 17.1 g. (0.1 mol) of benzyl bromide, and the whole is boiled for 12 hours under reflux, while stirring vigorously. The reaction mixture is then suction filtered, the filtrate is evaporated, and the residue is taken up in 1000 cc. of 1 N-hydrochloric acid. The neutral products are removed by extraction with ether. The hydrochloric acid solution is rendered alkaline with concentrated ammonia and is extracted with chloroform. When the chloroform extracts have been evaporated, the residue is recrystallized from the methylene chloride-ether, and yields the N-[1'-benzyl-piperidyl-(4')]-naphthalene-1:8-dicarboxylic acid imide in colorless crystals melting at 148 to 150° C. The product so obtained is identical in every way with the product obtained in Example 1.

*Example 3*

33.8 grams (0.074 mol) of N-(pyridyl-4')-naphthalene-1:8-dicarboxylic acid imide iodobutylate are dissolved in 300 cc. of methanol and then treated dropwise, while stirring and cooling with ice-water, with 50 cc. of an aqueous solution of 10% strength of sodium boron hydride. After the evolution of hydrogen has subsided, the reaction mixture is diluted with 800 cc. of water and the product is extracted with chloroform. After evaporation of the chloroform, the residue is crystallized from alcohol to yield N-[1'-butyl-1':2':3':6'-tetrahydropyridyl-(4')]-naphthalene-1:8-dicarboxylic acid imide of the formula

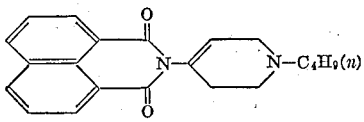

in the form of beige colored crystals melting at 133–135° C.

The hydrochloride which is prepared in the conventional manner melts after recrystallization from a mixture of ethanol and ether at 232–235° C.

16.7 grams (0.05 mol) of N-[1'-butyl-1':2':3':6'-tetrahydropyridyl-(4')] - naphthalene - 1:8 - dicarboxylic acid imide are dissolved in 100 cc. of glacial acetic acid and hydrogenated catalytically in the presence of 1.0 gram of platinum oxide at room temperature. After one mol equivalent of hydrogen (1.12 liters) has been taken up, hydrogenation is discontinued, the catalyst filtered off and the filtrate evaporated. The residue is dissolved in benzene and filtered through a column charged with 100 grams of aluminium oxide (activity II). The reaction mixture is eluted with 200 cc. of benzene, the solvent evaporated and the residue recrystallized from a mixture of methanol and ether to yield N-[1'-butyl-piperidyl-(4')]-naphthalene-1:8-dicarboxylic acid imide of the formula

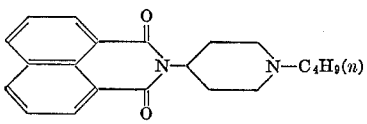

in the form of colorless crystals melting at 150–152° C.

The hydrochloride prepared in the conventional manner is recrystallized from a mixture of ethanol and ethyl acetate and melts at 268° C. with decomposition.

The N-(pyridyl-4')-naphthalene-1:8-dicarboxylic acid imide iodobutylate used as starting material may be prepared as follows:

19.8 grams (0.1 mol) of naphthalene-1:8-dicarboxylic acid anhydride are heated for 3 hours at 150–160° C. with 9.4 grams (0.1 mol) of 4-amino-pyridine in 60 cc. of dimethylformamide. On cooling, N-(pyridyl-4')-naphthalene-1:8-dicarboxylic acid imide of the formula

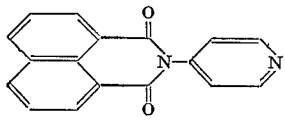

crystallizes out in the form of brown-colored, coarse prisms melting at 310–312° C.

A solution of 23 grams (0.084 mol) of N-(pyridyl-4')-naphthalene-1:8-dicarboxylic acid imide in 100 cc. of dimethylformamide and 50 cc. of butyl iodide is heated for 20 hours at 140° C. to yield N-(pyridyl-4')-naphthalene-1:8-dicarboxylic acid imide iodobutylate in the form of lemon-yellow colored crystals melting at 285° C. with decomposition.

What is claimed is:

1. A member selected from the group consisting of a compound of the formula

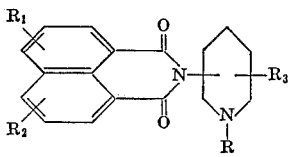

in which $R_1$ is a member selected from the group consisting of hydrogen, lower alkyl, lower alkoxy, halogen, nitro, amino and $R_2$ is a member selected from the group consisting of lower alkyl, lower alkoxy, halogen, nitro and amino, trifluoromethyl $R_3$ is a member selected from the group consisting of hydrogen and lower alkyl and R is a member selected from the group consisting of alkyl having from 1 to 12 carbon atoms, phenyl-lower alkyl, lower alkyl phenyl-lower alkyl, hydroxy-phenyl-lower alkyl, lower alkoxy-phenyl-lower alkyl, halogeno-phenyl-lower alkyl, nitrophenyl-lower alkyl, aminophenyl-lower alkyl and trifluoromethylphenyl-lower alkyl, naphthyl-lower alkyl, lower alkyl naphthyl-lower alkyl, hydroxy-naphthyl-lower alkyl, lower alkoxy-naphthyl-lower alkyl, halogeno-naphthyl-lower alkyl, nitro-naphthyl-lower alkyl, amino-naphthyl-lower alkyl and trifluoromethyl-naphthyl-lower alkyl, and an acid addition salt thereof.

2. A member selected from the group consisting of a compound of the formula

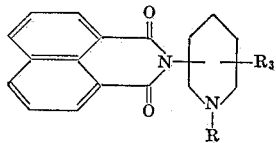

in which R is a member selected from the group consisting of alkyl having from 1 to 12 carbon atoms, phenyl-lower alkyl, lower alkylphenyl-lower alkyl, hydroxy-phenyl-lower alkyl, lower alkoxy phenyl-lower alkyl, halogeno-phenyl-lower alkyl, nitrophenyl-lower alkyl, aminophenyl - lower alkyl, trifluoromethylphenyl - lower alkyl, naphthyl-lower alkyl, lower alkyl naphthyl-lower alkyl, hydroxy-naphthyl-lower alkyl, lower alkoxy-naphthyl-lower alkyl, halogeno-naphthyl-lower alkyl, nitro-naphthyl-lower alkyl, amino-naphthyl-lower alkyl and trifluoromethyl-naphthyl-lower alkyl, $R_3$ is a member selected from the group consisting of hydrogen and lower alkyl, and an acid addition salt thereof.

3. A compound of the formula

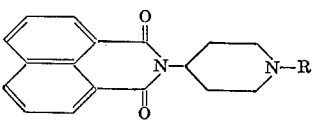

in which R is alkyl having from 4 to 12 carbon atoms.

4. An acid addition salt of a compound claimed in claim 3.

5. A compound of the formula

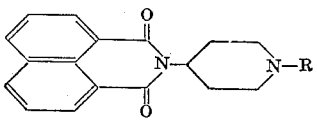

in which R is phenyl-lower alkyl.

6. An acid addition salt of a compound claimed in claim 5.

7. A member selected from the group consisting of N-[1'-benzyl-piperidyl - (4')]-naphthalene-1:8-dicarboxylic acid imide, and an acid addition salt thereof.

8. A member selected from the group consisting of N-[1'-butyl-piperidyl-(4')] - naphthalene - 1:8-dicarboxylic acid imide, and an acid addition salt thereof.

9. A member selected from the group consisting of a compound of the formula

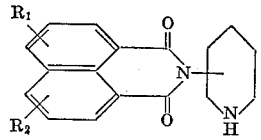

wherein $R_1$ and $R_2$ each is a member selected from the group consisting of hydrogen, lower alkyl, lower alkoxy, halogen, nitro and amino, and an acid addition salt thereof.

10. N-(piperidyl-4')-naphthalene-1:8-dicarboxylic acid imide.

11. A member selected from the group consisting of a compound of the formula

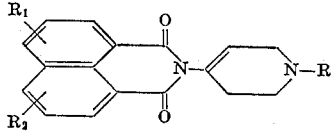

wherein $R_1$ and $R_2$ each is a member selected from the group consisting of hydrogen, lower alkyl, lower alkoxy, halogen, nitro and amino and R is a member selected from the group consisting of alkyl having from 1 to 12 carbon atoms, phenyl-lower alkyl, lower alkylphenyl-lower alkyl, hydroxyphenyl-lower alkyl, lower alkoxyphenyl-lower alkyl, halogeno-phenyl-lower alkyl, nitrophenyl-lower alkyl, aminophenyl-lower alkyl and trifluoromethylphenyl-lower alkyl, and an acid addition salt thereof.

12. N-[1'-butyl-1:2:3:6 - tetrahydropyridyl] - naphthalene-1:8-dicarboxylic acid imide.

References Cited by the Examiner

UNITED STATES PATENTS

| | | | |
|---|---|---|---|
| 2,830,991 | 4/1958 | Keller et al. | 260—281 |
| 2,833,777 | 5/1958 | Rorig et al. | 260—281 X |
| 2,878,455 | 8/1958 | Hoffmann et al. | 260—281 |
| 3,096,333 | 7/1963 | Wilsin et al. | 260—281 |

OTHER REFERENCES

Burger: Medicinal Chemistry, 2d edition (1960), pages 82, 442–4, 448–9, 454–5, 458–9.

Henne et al.: J. Am. Chem. Soc., vol. 58, page 882 (1936).

NICHOLAS S. RIZZO, *Primary Examiner.*

DON M. KERR, DONALD G. DAUS, *Examiners.*